United States Patent
McKenzie

(10) Patent No.: US 6,612,789 B2
(45) Date of Patent: Sep. 2, 2003

(54) COMPACT DISC SHAPING APPARATUS AND METHOD

(75) Inventor: Gary McKenzie, Lake Oswego, OR (US)

(73) Assignee: Ranz Johnson, Vancouver, WA (US)

( * ) Notice: Subject to any disclaimer, the term of this patent is extended or adjusted under 35 U.S.C. 154(b) by 0 days.

(21) Appl. No.: 09/795,039

(22) Filed: Feb. 23, 2001

(65) Prior Publication Data

US 2001/0026742 A1 Oct. 4, 2001

Related U.S. Application Data

(60) Provisional application No. 60/184,850, filed on Feb. 25, 2000.

(51) Int. Cl.[7] ............................................... B23C 3/00
(52) U.S. Cl. ..................... 409/132; 409/197; 409/199; 409/174
(58) Field of Search ................... 408/13, 16; 409/131, 409/132, 133, 138, 172, 174, 192, 197, 203, 218, 199, 225

(56) References Cited

U.S. PATENT DOCUMENTS

| | | | | |
|---|---|---|---|---|
| 5,100,270 A | * | 3/1992 | Dowdle et al. | 144/252.1 |
| 5,267,818 A | * | 12/1993 | Marantette | 144/135.4 |
| 5,439,328 A | * | 8/1995 | Haggerty et al. | 408/1 R |
| 5,529,441 A | * | 6/1996 | Kosmowski et al. | 408/1 R |
| 5,882,555 A | | 3/1999 | Rohde et al. | |
| 6,041,703 A | | 3/2000 | Salisbury et al. | |
| 6,059,495 A | * | 5/2000 | Mueller et al. | 221/124 |
| 6,109,840 A | * | 8/2000 | Raiteri | 269/309 |
| 6,328,507 B1 | * | 12/2001 | Shoda | 269/21 |

* cited by examiner

Primary Examiner—Daniel W. Howell
(74) Attorney, Agent, or Firm—Marger Johnson & McCollom, PC

(57) ABSTRACT

The system constructed according to the present invention operates by properly positioning a base compact disc (CD) onto a cutting table and then cutting the CD to a preprogrammed shape. Base CDs are stacked on an elevator system. The CDs include one side on which data is recorded, and another side on which the CD label is printed. A robotic arm with a vacuum gripper then picks-up a CD from the stack and moves the CD to a cutting table. While the arm moves the CD, a machine vision system takes a picture of the CD label and compares the picture to an image of the label stored in data. An image mapping program then determines the rotational orientation of the CD by comparing the picture and data image. Once the orientation of the disc is known, the robot arm rotates the disc a calculated amount so that it can then be placed on the cutting table in a proper normalized orientation. The CD is held in place on the cutting table by a vacuum chucking system. A routing tool then plunges through the CD and cuts an edge of a desired shape. Once cutting is complete, a second robotic arm with vacuum grippers picks up the shaped CD and associated single scrap piece. The shaped CD portion is placed on a vertical mandrel and the scrap piece is discarded in a bulk bin. The completed system is intended to have four (4) independent machine vision systems and routing stations so that four CDs can be shaped at the same time.

19 Claims, 10 Drawing Sheets

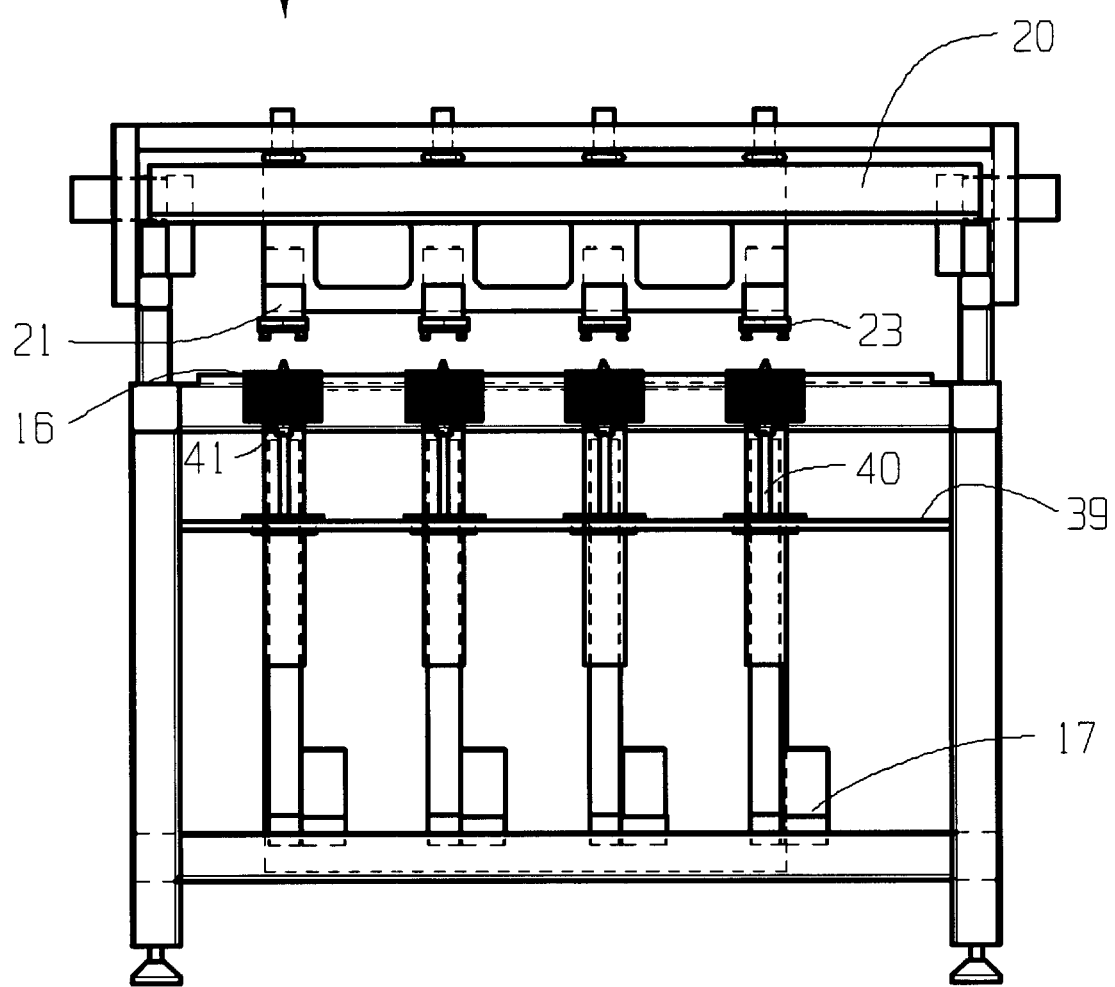

COMPACT DISC SHAPING APPARATUS AND METHOD

This application is a continuation of U.S. Provisional Patent No. 60/184,850 filed Feb. 25, 2000 whose contents are incorporated herein for all purposes.

BACKGROUND OF THE INVENTION

This invention relates generally to the forming of arbitrary shapes from sheet plastic material and more particularly to a method and apparatus for high volume, high quality cutting of shapes from CD-R, CD-RW, and DVD disks.

Compact discs are flat circular objects having at least one side on which data is recorded and read by laser. Examples of such discs include, CD, CD-R, CD-RW, and DVD discs. The non-recorded side of the disc is typically imprinted with a label identifying the contents of the disc, such as an album cover for a music CD or box-cover art for a DVD-based game. Recently, there has been a market for discs having a non-circular shape. For example, companies have desired that CDs be formed to the approximate size and shape of a business card. Such a disc could be carried around in a person's wallet, stored with other business cards, include the name of the company imprinted on one side of the card, and yet be capable of holding vast amounts of marketing information on the data portion of the card when read by a proper reader device, such as a computer's CD-ROM drive.

Because the machinery already exists to apply labels to regular CDs, the label is often applied to the CD prior to the shaping process. It is necessary, therefore, that the CD be shaped in such a fashion so as not to cut off a portion of the label. This requires that disc be properly oriented on the disc machining table prior to cutting.

Prior art machines for cutting CD products into non-circular shapes include a shape cutting device that uses a routing or grinding tool to follow a form which has been machined to the desired shape. Individual CD's are oriented to the proper rotational location by operators who visually align specially printed marks or machined orientation features on the CD with a reference mark or feature on the machine. Multiple oriented CD's are placed on top of one another and clamped together. The entire stack is then simultaneously cut into the shape dictated by the form. The shaped CD's are then unclamped and individually removed from the stack for further packaging. An example of this type of system is found in U.S. Pat. No. 5,882,555.

Several problems occur with the above stated shape forming process. The process requires the design and fabrication of a form which is an extra expense and requires time and resources to complete. The use of a specially printed or machined registration mark requiring human alignment increases product cost and lengthens the manufacturing cycle. Stacking of CD disks requires care to avoid scratching and poses difficulty in generating a smooth cut edge due to the raised spacing ring molded into the bottom surface of each CD. This spacing ring induces a space between adjacent CD's in the stack which can result in flutter during the cutting process. A clamping device may be used to bend the CD's and eliminate the spacing—however, this also results in poor quality cut edges.

Accordingly, the need exists for an apparatus and cutting method that overcomes the limitations of the prior art.

SUMMARY OF THE INVENTION

It is, therefore, an object of the invention to provide means to easily cut CD's into a wide variety of shapes at high volume production rates.

Another object of the invention is to provide a means to automatically orient previously printed CD's using existing label graphics.

Another object of the invention is to provide a method of easily securing the CD into position prior to the shaping operation.

Another object of the invention is to improve the edge quality of the shaped CD.

Another object of the invention is to provide a means to easily change between shape profiles and to create new shape profiles.

An apparatus for cutting CDs constructed according to a preferred embodiment of the invention comprises a large format, gantry type 3-axis CNC mechanism to which multiple high-speed routers are attached. The CNC mechanism consists of accurately controlled closed loop motion in the X, Y, and Z-axes via stepper or servo motor driven ball screws or belt drives. Multiple high-speed router heads are appropriately spaced and attached to the CNC mechanism's Z-axis. Various types of router bits including single and multiple flute straight or spiral designs may be installed in the router to perform the actual cutting operation. A means for trapping and exhausting cutting debris is attached to the router head.

On the fixed machine frame to which the CNC mechanism is attached, multiple vacuum chuck sites are mounted correspondingly to the multiple router heads. Two vacuum chucks are mounted in close proximity to each router head. Each vacuum chuck consists of an upper plate covered with a resilient, high friction material through which numerous holes are drilled. This plate is mounted to a lower plenum chamber that is connected to a vacuum source. A center mandrel on the upper plate provides registration of the CD to the vacuum chuck. When a CD is placed on the upper plate and the vacuum source activated, the CD is pulled into the resilient material and held in position by the vacuum force and frictional characteristics of the cover material. The resilient material provides a non-destructive path for the router bits to traverse during the cutting operation.

A CD loading and orienting system is attached to the front of the fixed machine frame. This system consists of an elevator mechanism, a 4-axis motion mechanism, and a multiple camera machine vision system.

The elevator mechanism consists of multiple vertical stacks of CDs spaced to correspond with one set of vacuum chucks. CDs are loaded into the elevator on mandrels without regard to orientation of the graphic label printing. Each mandrel stack of CD's is attached to a Z axis motion control mechanism which moves the stack upward on command and presents the top CD in each stack to a uniform and repeatable height.

The 4-axis motion mechanism consists of an overhead gantry controllable in the X-, Y-, and Z-axes. Multiple CNC rotary axes are attached to the Z-axes. To the rotary axes are attached vacuum gripping devices that when activated provide suction force to pick-up the top CD in each stack. The motion mechanism is sized to provide movement from a position directly over the CD elevator stacks to the vacuum chucks.

The machine vision system consists of multiple cameras mounted on a fixed frame directly above each CD stack in the elevator mechanism. The cameras are connected to a vision processing system that may be integrated with the camera or at a central remote site. On command from the central machine control system, the cameras snap pictures of the top CD in each elevator stack. The machine vision system has been previously trained to identify a specific feature on each products graphic label. This feature need only be a particular element, such as a straight line or other geometric form of the standard graphic, not a special mark applied to the label whose only purpose is for orientation. The orientation of the feature is determined by the vision processing system and the deviation from the desired orientation is calculated. This deviation is translated into a motion command which is sent to each individual rotary axis. Each rotary axis rotates its CD independently so that the graphic label is oriented correctly for proper shape cutting.

In operation, each camera located over a CD snaps a picture, has an angular deviation calculated by the vision processing system, and a motion command transmitted to each rotary axis on the 4 axis motion mechanism. While vision computations are underway, the motion mechanism positions the vacuum gripping devices over each CD stack and picks the top CD in each stack. After the CDs are lifted from the stacks, the vision computed motion command is executed and each CD is independently rotated into the proper orientation for shaping as the motion mechanism moves to place the CDs on the vacuum chucks.

A shaped CD and scrap material unload system is attached to the rear of the fixed machine frame. This system is comprised of a 3-axis motion mechanism, a CD receiving means, and a scrap removal system.

The 3-axis motion mechanism consists of an overhead gantry controllable in the X, Y, and Z axes. To each Z axis are attached vacuum gripping devices that when activated provide suction force to independently pick-up the shaped CD and its associated scrap material in each vacuum chuck location. The motion mechanism is sized to provide movement from a position directly over the vacuum chucks to positions corresponding to shaped CD unload and scrap disposal.

The CD receiving means are vertical mandrels spaced correspondingly to one of a corresponding pair of the vacuum chucks on which the shaped CDs are released. When the mandrel is full, it is removed from the machine for subsequent packaging operations. The scrap material remaining from the cutting operation is deposited in a scrap removal system consisting of a scrap chute which directs the scrap material to the scrap bin located underneath the machine.

In operation, when the CD cutting operation is complete, the machine control system signals the unload motion mechanism to position the vacuum grippers over the shaped CD and scrap material. The shaped CD and scrap material are removed from the vacuum chuck after the chuck releases. The motion mechanism positions the vacuum gripper so that the scrap material is simultaneously deposited in a scrap chute by releasing only that portion of the vacuum gripper. The motion mechanism then locates so that the shaped CD's are simultaneously deposited on the receiving mandrels.

An alternative embodiment of the invention would be to have the shaped CD automatically inserted into a plastic shipping sleeve and then into a shipping container.

The foregoing and other objects, features and advantages of the invention will become more readily apparent from the following detailed description of a preferred embodiment of the invention that proceeds with reference to the accompanying drawings.

BRIEF DESCRIPTION OF THE DRAWINGS

FIG. 5a is a front view of the 4-axis motion mechanism for CD pick, orient, and place on the vacuum chuck.

DETAILED DESCRIPTION

Figure 1:
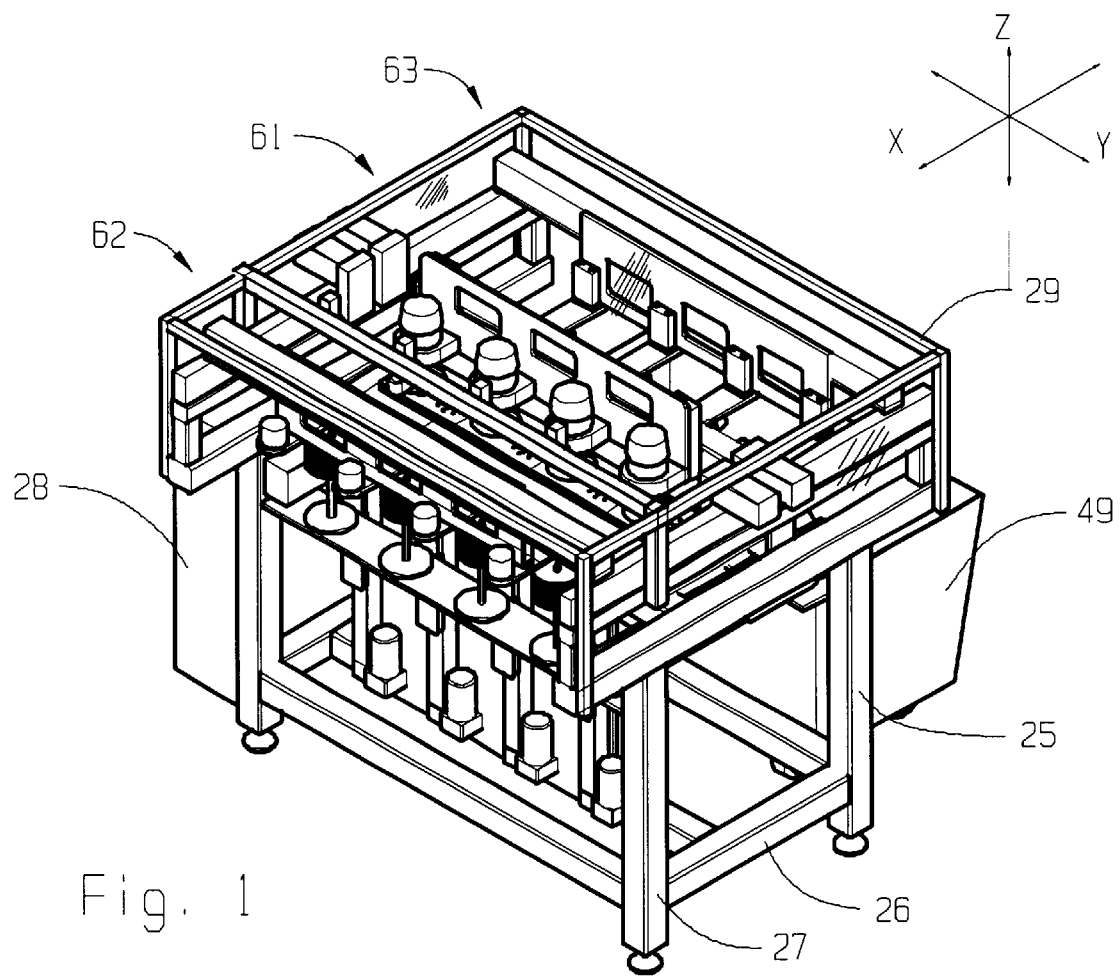
FIG. 1 is an isometric view of a complete CD shape cutting machine according to the present invention.

FIG. 1 is an isometric view of a CD shape cutting machine according to the present invention showing a shape forming mechanism 61 joined on the left by a load and orient mechanism 62 and on the right by an unload mechanism 63. Mechanisms 61, 62, and 63 are mounted on and supported by a structural fixed frame 25 consisting of horizontal 26 and vertical 27 members rigidly secured to each other. Control electronics 28 are mounted within an enclosure attached to the fixed frame 25. A modular safety enclosure 29 covers the portion of mechanisms 61, 62, and 63 where motion or cutting occurs.

Figure 2:
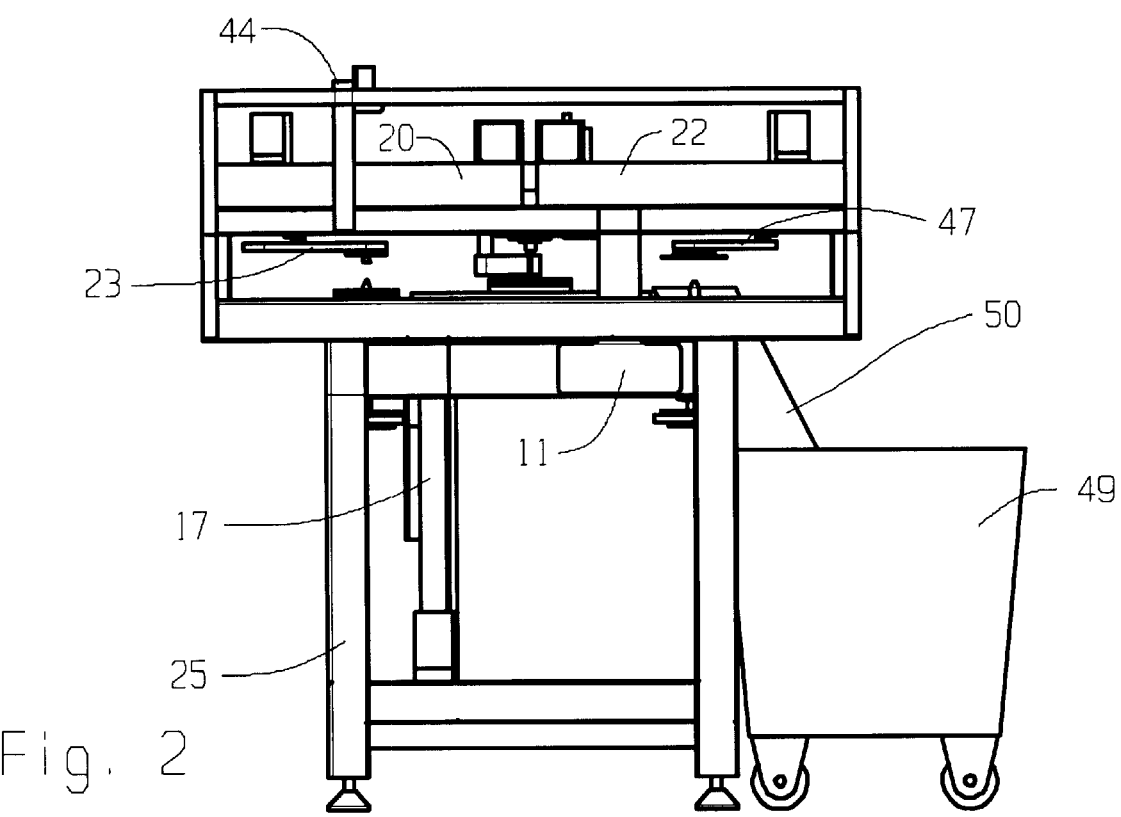
FIG. 2 is a side elevation of the CD shape cutting machine shown in FIG. 1.

FIG. 2 is a side elevation of the CD shape-cutting machine shown in FIG. 1. The relative positions of the 4 primary motion mechanisms are shown which includes the 3-Axis CNC router mechanism 11, the 4-Axis CNC CD load mechanism 20, the 3-Axis CNC unload mechanism 22, and the single axis elevator mechanism 17. The CD load gripper 23 includes a rotary axis to align the CD for proper shaping while the CD unload gripper 47 includes multiple vacuum zones to accommodate both the shaped CD and the remaining scrap material. The scrap chute 50 and scrap bin 49 are also shown.

Figure 3:
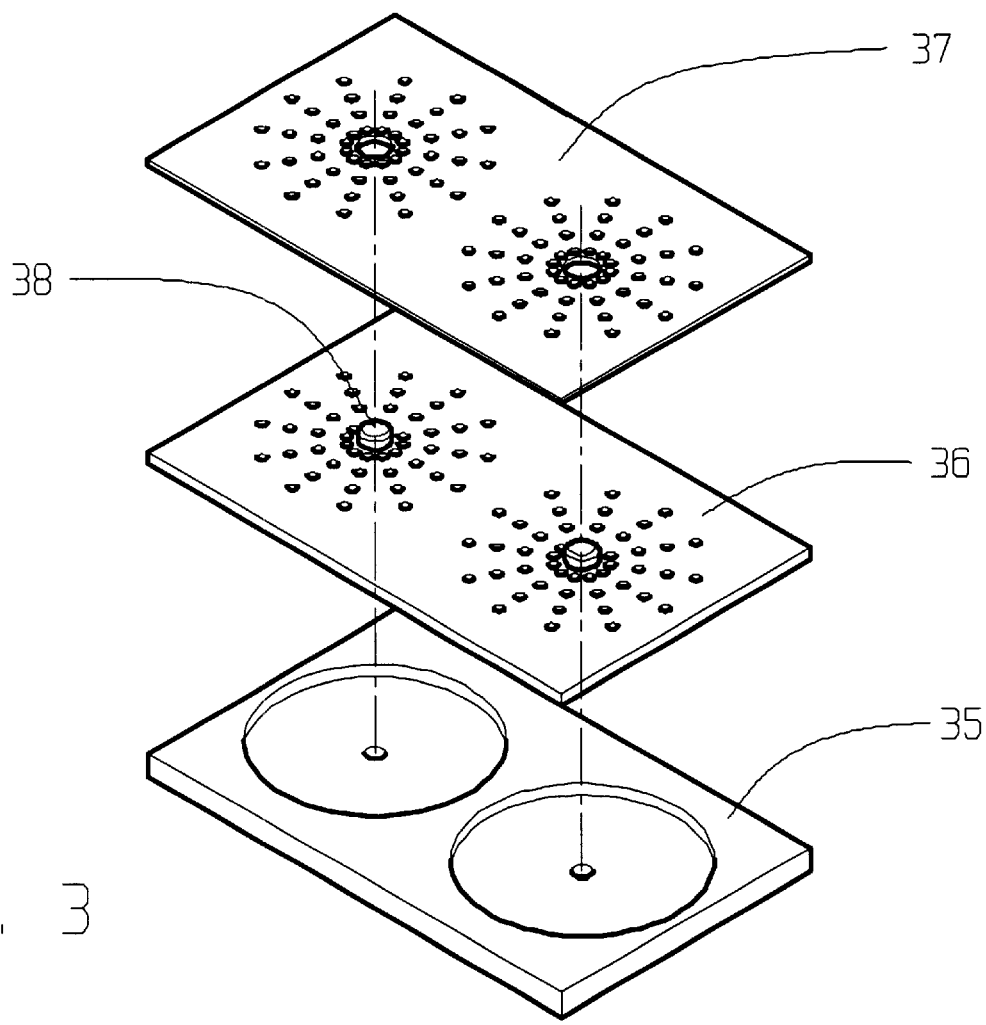
FIG. 3 is an isometric view of a vacuum chuck previously shown in FIG. 1.

FIG. 3 is an exploded isometric view of the vacuum chuck which illustrates the construction of the chuck. The lower plenum 35 consists of a plate with two machined recesses to which a vacuum source is connected. An upper plate 36 with strategically drilled thru holes and a centering boss 38 is secured to the plenum plate to allow vacuum to be applied to the bottom surface of the CD. A thin sheet of resilient material 37 is applied to the top surface of the upper plate and corresponding holes are cut through this material. The resilient material provides a cushion for the CD to prevent scratching, a high friction surface which aids in holding the CD in position during the shaping process, and a soft material that will not dull the router bits 18 as they cut the CD material.

More specifically, the resilient material serves a four-fold purpose:

1. Provide a soft, pliable surface that will enhance the holding or gripping vacuum force during the shaping process. The shaping process imparts significant forces on the CD material and could easily move the part out of position if the surface is hard and smooth.

2. Provide a soft, pliable surface that will not mar or scratch the CD material.
3. Provide a soft material through which the tip of the router bit can move without damaging or dulling the bit.
4. Provide a soft pliable surface into which the spacer ring may be embedded by the vacuum force during the cutting process. The spacer ring is much less of an issue when cutting a single CD at time. The prior art stacked CD's on top of each other and the spacer ring is a significant issue there. This invention shapes multiple single CD's while the prior art shapes a single stack of multiple CD's.

Figure 4:
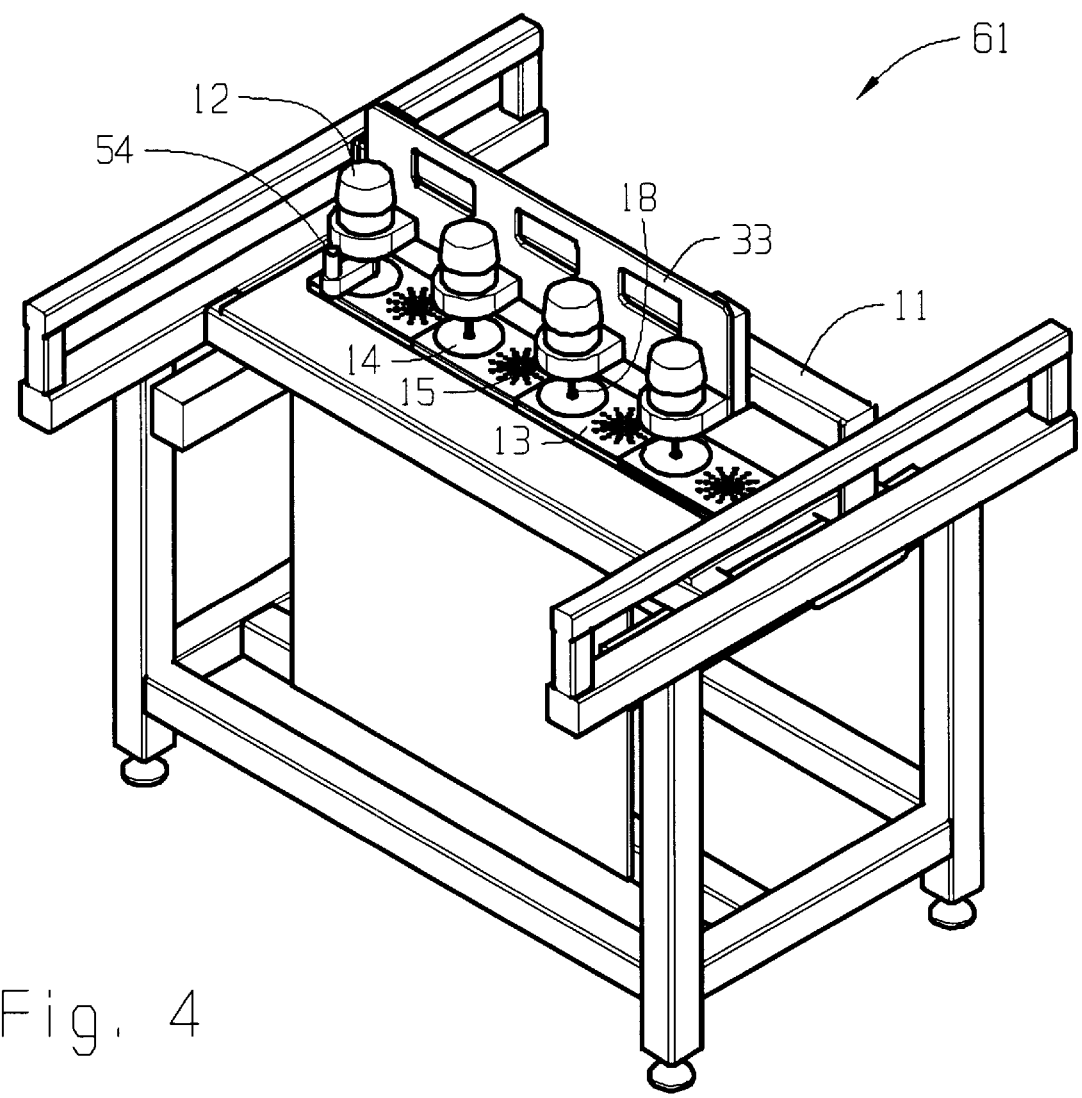
FIG. 4 is an isometric view of the CD shape cutting mechanism previously shown in FIG. 1.

FIG. 4 is an isometric view of the CD shape forming assembly 61 shown in FIG. 1. A 3 axis CNC motion mechanism 11 is attached to the central portion of the structural frame 25. The motion mechanism is an overhead gantry type that provides movement along X, Y, and Z-axes. Each axis of motion is comprised of a motor driven ball screw or drive belt actuator stage. A single router mounting plate 33 is attached to the Z-axis 32 and to which multiple routers 12 are securely mounted at equally spaced intervals. The multiple routers 12 are simultaneously moved in the three axes of motion so that each router will cut the same shape. A router bit 18 is secured in each router 12 and enclosed by a debris shroud 54 that is connected to a remote collection system.

The quality of the shaped CD edge is determined by a combination of router bit type, the rotational speed of the router bit, and the feed speed of the router bit through the CD material. Our evaluations to date have used standard router bits that the manufacturers have recommended for plastic use. The bits tested include single flute straight, double flute straight, and upcut single flute spiral. We have qualitatively determined that the spiral cutter produces a slightly better edge quality than the single flute straight with the double flute straight trailing both significantly. In terms of rotational bit speed (rpm), we to date have simply used the maximum speed of our purchased router which is approximately 22,000 rpm. It is our contention that rotational speeds in the 20,000–30,000 rpm range is required to produce superior edge quality. Feed speed through the plastic material has been optimized to balance throughput with edge quality. We have found superior edge quality in the 120–200 inch/minute feed range.

Mounted to the fixed frame 25 are multiple dual vacuum chucks 13 that are located correspondingly to the multiple router heads 12. The mechanism is cutting a shape on the left vacuum chuck location 14 while the right vacuum chuck 15 location has been unloaded of the previously shaped CD and thereafter loaded with the next CD to be shaped. The cutting process alternates between the two vacuum chuck positions.

FIG. 5a is a front view of the CD Load and Orient Assembly 62 shown in FIG. 1. A 4-Axis CNC motion mechanism 20 positions multiple rotary actuators 21 with vacuum grippers 23 to allow picking of unoriented CD's from the elevator mechanisms 17. The elevator mechanism 17 consists of a fixed mandrel receptacle plate 39 to which multiple vertical center mandrels 40 are inserted. The number of center mandrels is equal to the number of router heads used on the machine. The center mandrels 40 provide a means to accurately place CD's in a vertical stack using the center hole of the CD. A lifting fork 41 is attached to the elevator mechanism 17 and is positioned near the receptacle plate 39 prior to loading of the CD's. A stack 16 of CD's is placed over the center mandrel and rests on the lifting fork. As each CD is removed from the top of the stack, the elevator mechanism lifts the stack an amount equal to the thickness of one CD. In this manner a CD is presented for pick-up and orientation at a consistent height. The multiple independent elevator mechanisms perform in the same manner, all presenting the topmost CD in the stack to the same elevation regardless of the number of CD's in the stack 16. Upon completion of a stack, the vertical CNC motion mechanism returns to its start position and awaits the next stack to be loaded.

Figure 5B:
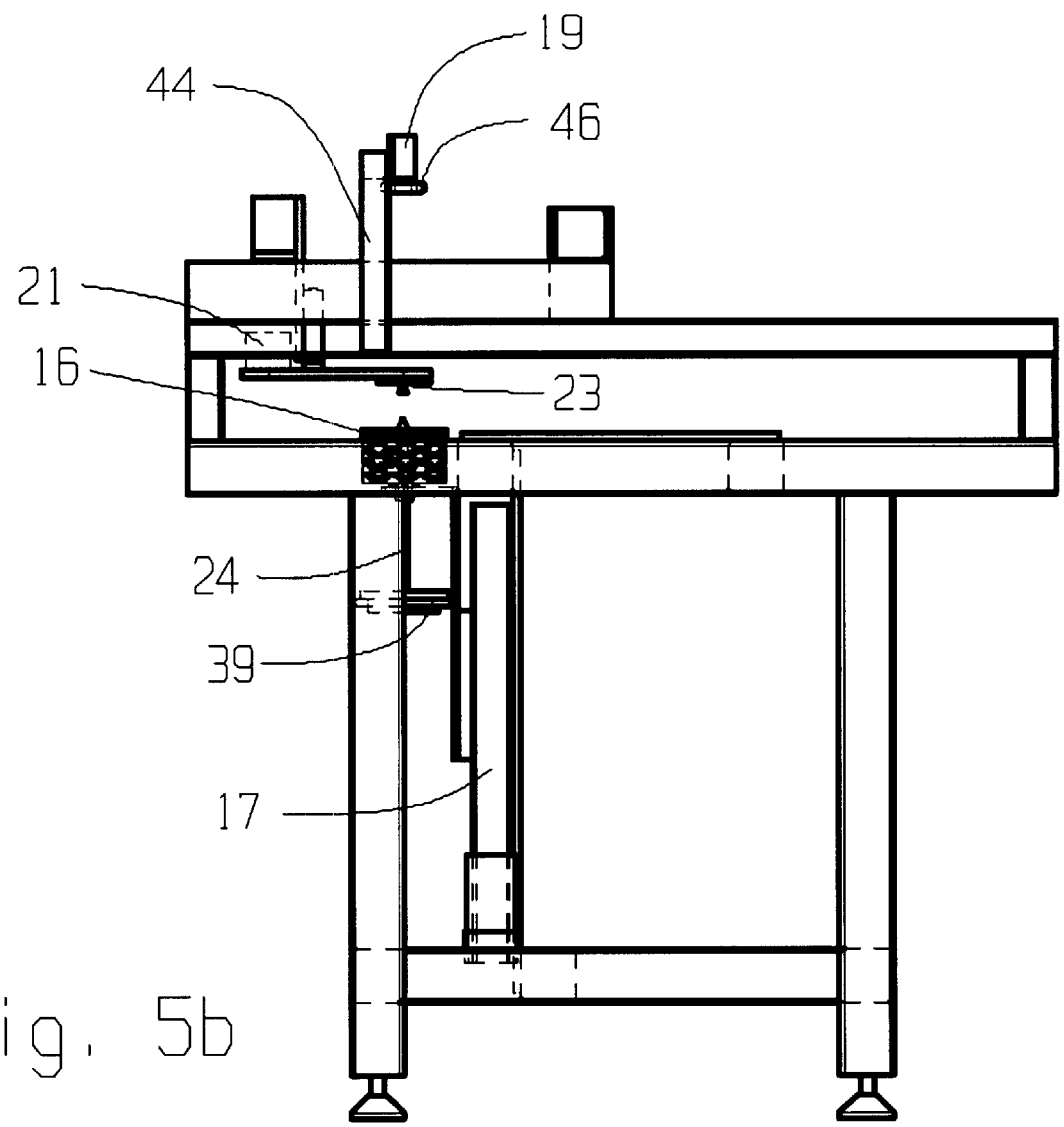
FIG. 5b is a side elevation of the 4-axis motion mechanism for CD pick, orient, and place on the vacuum chuck.

FIG. 5b is a side elevation of the CD Load and Orient Assembly 62 shown in FIG. 1. The 4-Axis CNC motion mechanism is an overhead gantry type that provides linear movement along the X-, Y-, and Z-axes. Each linear axis of motion is comprised of a motor driven ball screw or belt drive actuator stage. The $4^{th}$ axes are multiple independent rotary axes 21 to which are coupled to vacuum grippers 23. The vacuum grippers are offset from the rotary axes via a belt or chain drive to allow for a thin gripper arm cross-section when placing the CD on the vacuum chuck.

Machine vision cameras 19 and light sources 46 are mounted to a fixed overhead framework 44 positioned to be directly above each stack of CD's 16 located by a centering mandrel 24 and the CD elevator mechanism 17. Each machine vision camera is electronically connected to a vision processor that analyzes images captured by the cameras. Using industry standard algorithms for determining an angle of a feature in the field of view, the processor will compute the rotary orientation of the CD. This information is then translated into motion commands for the rotary axes 21 that then rotate the CD to the proper orientation for cutting. The feature used to determine angular orientation is identified prior to starting production and is trained to the vision system in a one-time operation.

Figure 6:
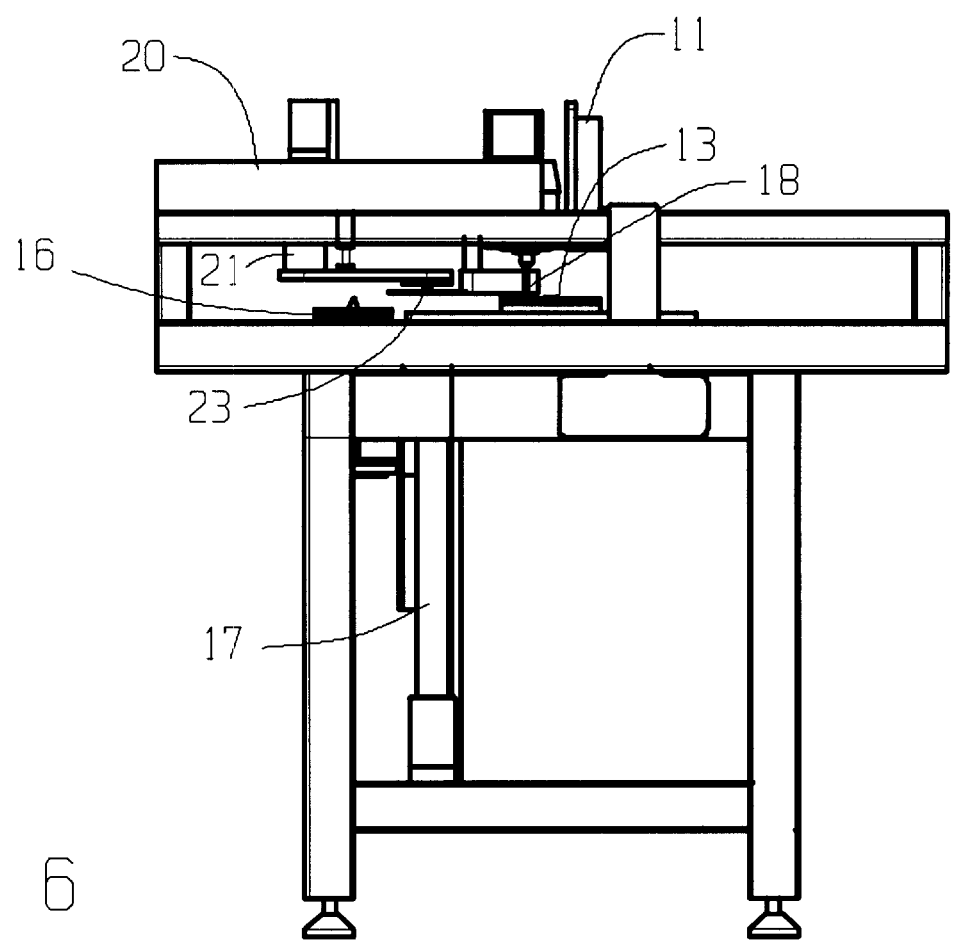
FIG. 6 is a side elevation of the 4-axis motion mechanism for CD pick, orient, and place on the vacuum chuck shown in an intermediate, engaged position with a CD.

FIG. 6 shows the 4 axis CNC motion mechanism in an intermediate position as it moves the CD from the pick-up position over the elevator stack 17 to the vacuum chuck 13 location. To minimize cycle time, the CD is rotated to the proper orientation during this transit between the two locations. While the motion mechanism is moving to the vacuum chuck load position, the machine vision cameras are snapping the next image of the top CD in the elevator stack, processing the angular deviation, and preparing the motion commands for the next pick and place cycle of the motion mechanism.

Figure 7:
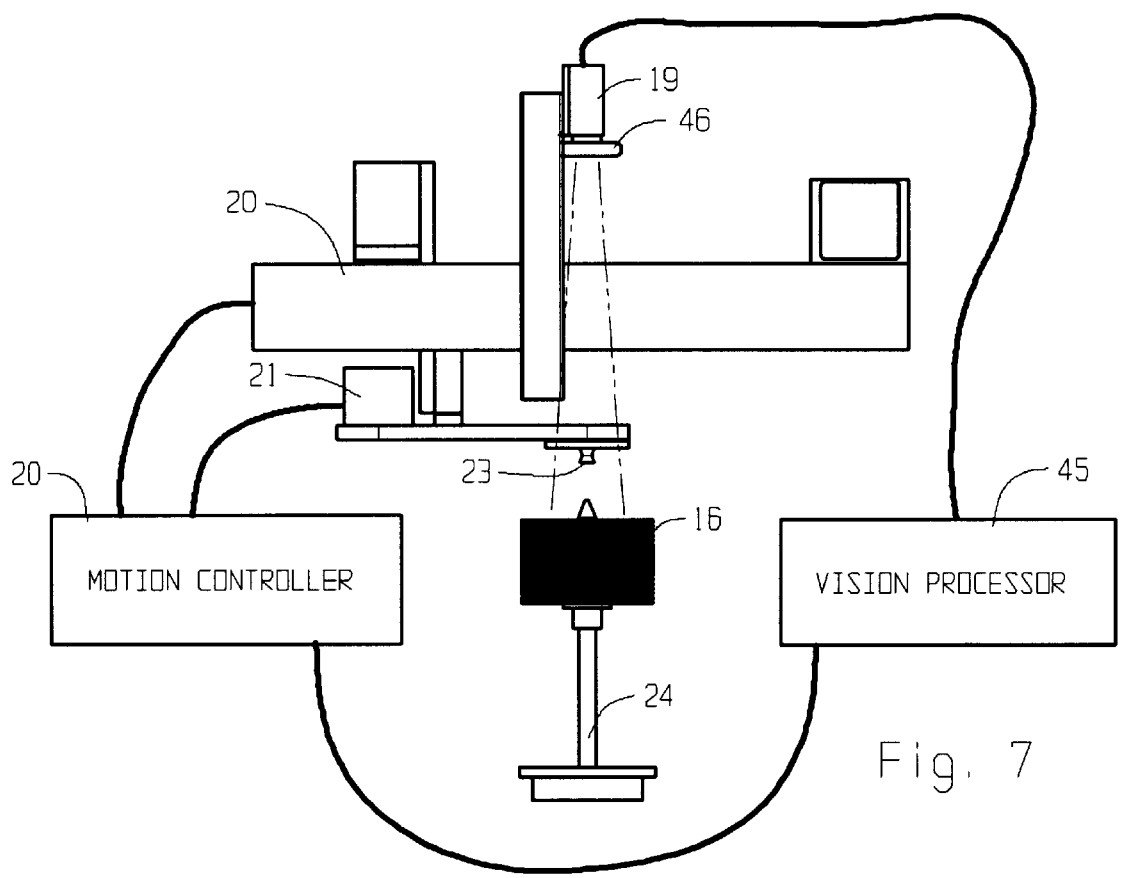
FIG. 7 is a schematic of the machine vision system used for CD orientation prior to shaping.

FIG. 7 is a schematic diagram of the machine vision system used for CD orientation. Multiple machine vision cameras 19 are connected to a vision central processing unit 45 consisting of frame grabbers, image-processing hardware, and associated vision analysis software. Those skilled in the art would understand that the vision CPU 45 could be a self-contained unit within the camera body. Each camera is provided with a light source 46 to maximize image quality. Angular deviations from the desired CD orientation are calculated by the vision algorithms based on the image of the CD graphic label provided by the cameras. The angular deviation is translated into a motion command which is communicated to the motion controller and then to the corresponding rotary actuator 21. The rotary actuator turns the CD the proper number of degrees so that the printed graphic label is correctly oriented for the cutting operation.

Figure 8A:
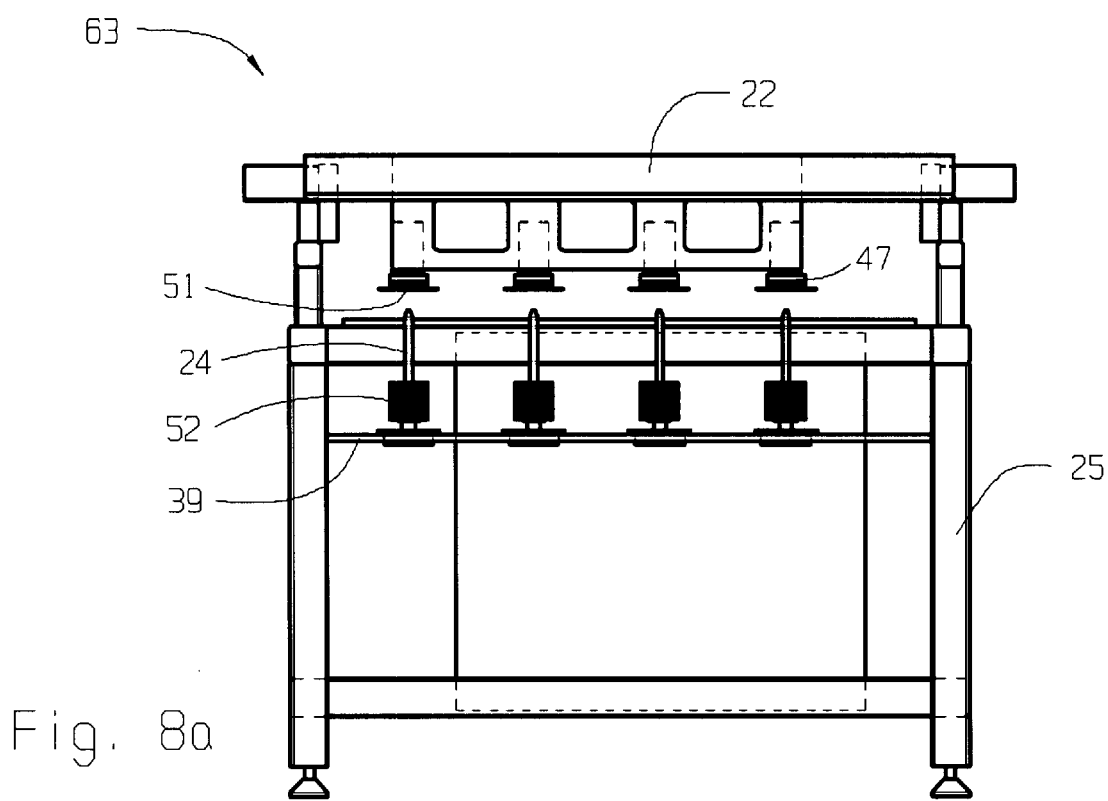
FIG. 8a is a rear view of the 3-axis motion mechanism used to remove the shaped CD and associated scrap material.

FIG. 8a is a rear view of the CD Unload Assembly 63 used to remove the shaped CD and associated scrap material from each vacuum chuck and place the parts appropriately. The 3-Axis motion mechanism 22 is an overhead gantry type that provides linear movement along the X-, Y-, and Z-axes. The motion mechanism is mounted on the fixed frame 25. Each linear axis of motion is comprised of either a motor driven ball screw or drive belt or pneumatic powered actuator stage. Attached to the Z-axis are multiple offset vacuum grippers 47 whose spacing corresponds to the vacuum chuck spacing. The vacuum grippers have two distinct suction sections that allow for independent pick-up and release of the shaped CD and its associated scrap material. Attached to the fixed frame is a mandrel receptacle plate 39 in which vertical mandrels 24 are positioned. The shaped CD 52 is placed on the stack when the motion mechanism 22 positions the center of the shaped CD over the mandrel tip 24 and releases the part.

Figure 8B:
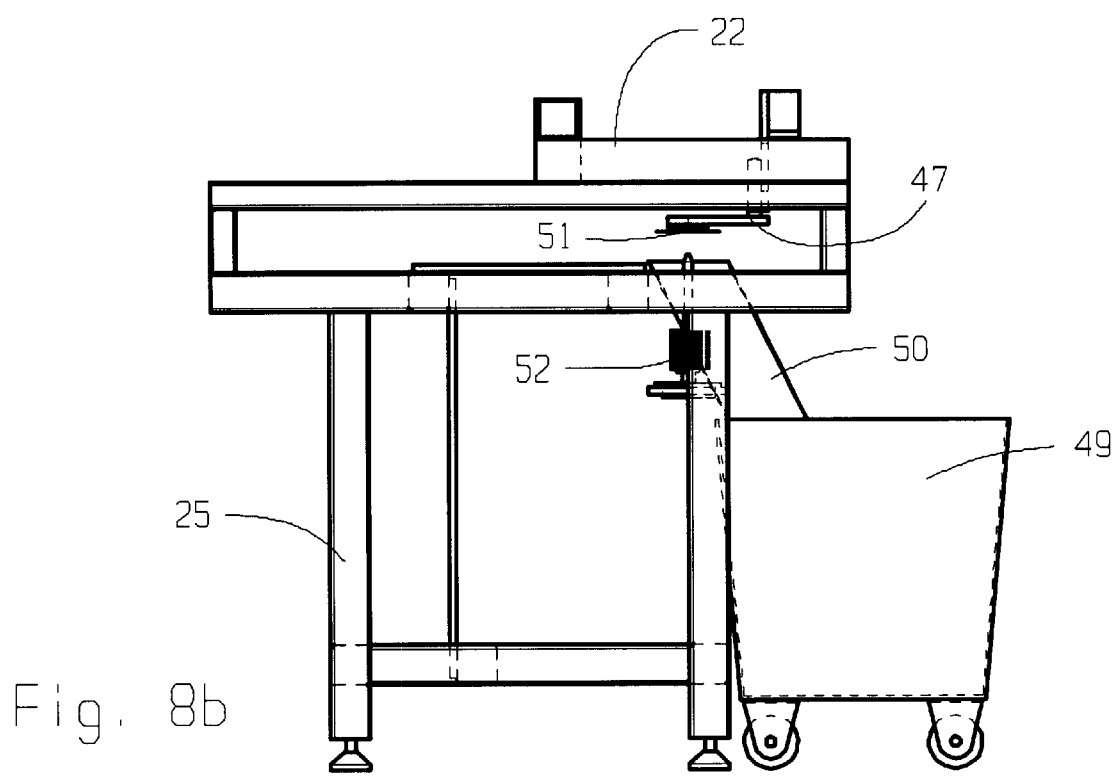
FIG. 8b is a side elevation of the 3-axis motion mechanism used to remove the shaped CD and associated scrap material.

FIG. 8b is a side elevation of the CD Unload Assembly 63 shown in FIG. 1. The shaped CD has been deposited on the mandrel stack 52 and the scrap material 51 is positioned over the scrap chute 50 by the 3-Axis motion mechanism 22. The unload vacuum gripper 47 will release the scrap material which will fall down the chute and into the scrap bin 49.

The machine is intended to be controlled by an industrial grade personal computer. In addition to custom machine control software, a commercially available CAD/CAM software package (such as that available from BobCad, Inc. of Clearwater, Fla.) will be loaded on the machine. There are several other commercially available software packages however this one was chosen due to its integrated CAD/CAM features, ease of use, and cost effectiveness. This software will allow the import of CD shape drawings created on many different CAD programs and formats. Once imported, the CD shape is quickly (minutes) converted to a CAM program to run the 3-Axis CNC Router Mechanism and cut the desired shape. This shape program is then stored in a shape library on the computer hard drive and is available at all times for re-use or editing into modified shapes. In addition, shapes may be originally created within the CAD portion of the resident software package and thence converted to an associated CAM program. The use of a CAD/CAM software controlled CNC routing mechanism allows the user near infinite shape creation and cutting ability subject only to the physical size limitations of the base CD and the diameter of the router bit (i.e., such a system will have difficulty cutting sharp inside corners).

Having described and illustrated the principles of the invention in a preferred embodiment thereof, it should be apparent that the invention can be modified in arrangement and detail without departing from such principles. I claim all modifications and variation coming within the spirit and scope of the following claims.

I claim:

1. An apparatus for shaping a compact disc having a preprinted image formed on a side thereof, comprising:
   stacking means for mounting a plurality of compact discs thereon, each of said compact discs capable of being mounted on said stacking means with an angular deviation from a desired rotational position;
   a camera positioned over the stacking means for taking a picture of the image preprinted on a top one of the compact discs mounted on the stacking means;
   means for calculating from the picture taken by the camera the angular deviation of the top the desired rotational position and rotating the disc by the angular deviation;
   a cutting table having a support surface for holding a disc placed thereon in the desired rotational position, said cutting table including a cutting tool positioned above the support surface; and
   means for transferring the top disc from the stacking means to the cutting table in the desired rotational position.

2. The apparatus of claim 1, the support surface of the cutting table including:
   a lower plenum in communication with a vacuum source;
   a resilient layer positioned over the lower plenum, said resilient layer including means for communicating vacuum to a top surface of the resilient layer.

3. The apparatus of claim 2, the lower plenum including two openings in communication with the vacuum source for holding two compact discs.

4. The apparatus of claim 3, said cutting table including a plurality of cutting positions on the support surface and a plurality of respective cutting tools positioned over the cutting positions, wherein the cutting tools are coupled to a common frame for simultaneous and identical shaping of the plurality of compact discs supported on the cutting table at the cutting positions.

5. The apparatus of claim 1, wherein the cutting tool includes a router bit selected from the group consisting of a single flute straight, a double flute straight, and an upcut single flute spiral.

6. The apparatus of claim 5, wherein the router is spun at rotational speeds between about 20,000 and 30,000 rpm.

7. The apparatus of claim 1, wherein the stacking means includes:
   an elevator mechanism;
   a lifting fork; and
   a center mandrel on which the compact discs are mounted.

8. The apparatus of claim 1, further including an unload unit having a vacuum gripper with two distinct suction sections for independent pick-up and release of the shaped compact disc and its associated scrap material.

9. A method of shaping a compact disc, the method comprising:
   detecting pre-printed image on a surface of the compact disc, wherein detecting the pre-printed image comprises obtaining a video image of the surface of the compact disc with a camera, and analyzing the image obtained from the camera;
   rotating the compact disc to align the pre-printed image with a pre-determined location; and
   placing the compact disc into a shaping apparatus for shaping of the compact disc, wherein the shaping is performed after the compact disc is in the pre-determined location.

10. A method of shaping a compact disc, the method comprising:
    detecting pre-printed image on a surface of the compact disc;
    rotating the compact disc to align the pre-printed image with a pre-determined location; and
    placing the compact disc into a shaping apparatus for shaping of the compact disc, wherein the shaping is performed after the compact disc is in the pre-determined location and further includes the steps of:
    placing the compact disc on a resilient surface; and
    applying vacuum pressure through the resilient surface to the compact disc so that the compact disc is held to the resilient surface.

11. A method of shaping a compact disc, the method comprising:
    detecting pre-printed image on a surface of the compact disc;
    rotating the compact disc to align the pre-printed image with a pre-determined location; and placing the compact disc into a shaping apparatus for shaping of the compact disc, wherein the shaping is performed after the compact disc is in the pre-determined location, wherein the compact disc is rotated while the compact disc is engaged by a handling device.

12. The method of claim 9 wherein detecting the pre-printed image on the surface of the compact disc is performed with a sensor.

13. The method of claim 12 wherein the pre-printed image includes an index mark.

14. The method of claims 13 wherein the index mark is located on the surface of the compact disc at a pre-determined radial position.

15. The method of claim 13 wherein the sensor is an optical sensor positioned to detect the pre-printed image or index mark located on the compact disc.

16. The method of claim 12 wherein the sensor is an optical sensor that detects light reflected off of a surface of the compact disc.

17. The method of claim 11, further comprising sending a motion command to the handling device responsive to the analyzing step.

18. The method of claim 10, further comprising shaping the compact disc by plunging a routing tool through the compact disc and into the resilient surface and cutting an edge of a desired shape to result in the shaped disc and a scrap piece.

19. The method of claim 18, further comprising:
simultaneously moving the shaped disc and scrap piece from the shaping apparatus;
stacking the shaped disc on a vertical mandrel; and
discarding the scrap piece in a bulk bin.

* * * * *

UNITED STATES PATENT AND TRADEMARK OFFICE
CERTIFICATE OF CORRECTION

PATENT NO.    : 6,612,789 B2
DATED         : September 2, 2003
INVENTOR(S)   : McKenzie It is certified that error appears in the above-identified patent and that said Letters Patent is hereby corrected as shown below:

Column 7,
Line 58, "of the top the" should read -- of the top disk from the --.

Signed and Sealed this

Fifteenth Day of June, 2004

JON W. DUDAS
*Acting Director of the United States Patent and Trademark Office*